United States Patent
Yang et al.

(10) Patent No.: US 12,347,439 B2
(45) Date of Patent: Jul. 1, 2025

(54) MULTI-TASK LEARNING FOR PERSONALIZED KEYWORD SPOTTING

(71) Applicant: QUALCOMM Incorporated, San Diego, CA (US)

(72) Inventors: Seunghan Yang, Incheon (KR); Byeonggeun Kim, Seoul (KR); Inseop Chung, Seoul (KR); Simyung Chang, Suwon (KR)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/153,932

(22) Filed: Jan. 12, 2023

(65) Prior Publication Data

US 2023/0298592 A1    Sep. 21, 2023

Related U.S. Application Data

(60) Provisional application No. 63/322,164, filed on Mar. 21, 2022.

(51) Int. Cl.
| | | |
|---|---|---|
| *G10L 17/14* | (2013.01) | |
| *G10L 17/04* | (2013.01) | |
| *G10L 17/18* | (2013.01) | |
| *G10L 17/24* | (2013.01) | |

(52) U.S. Cl.
CPC ............. *G10L 17/14* (2013.01); *G10L 17/04* (2013.01); *G10L 17/18* (2013.01); *G10L 17/24* (2013.01)

(58) Field of Classification Search
CPC ......... G10L 17/04; G10L 17/18; G10L 17/24; G10L 15/16; G10L 2015/088; G10L 15/08; G10L 17/08
See application file for complete search history.

(56) References Cited

U.S. PATENT DOCUMENTS

| | | | |
|---|---|---|---|
| 9,711,148 B1* | 7/2017 | Sharifi | .................... G10L 17/04 |
| 2014/0122087 A1* | 5/2014 | Macho | .................... G10L 15/22 |
| | | | 704/275 |
| 2018/0286433 A1* | 10/2018 | Hicks | .................. G10L 21/0232 |

(Continued)

OTHER PUBLICATIONS

International Search Report and Written Opinion—PCT/US2023/060959—ISA/EPO—Apr. 11, 2023.

(Continued)

*Primary Examiner* — Huyen X Vo
(74) *Attorney, Agent, or Firm* — Polsinelli LLP

(57) ABSTRACT

Systems and techniques are provided for processing audio data. For example, the systems and techniques can be used for personalized keyword spotting through multi-task learning (PK-MTL). A process can include obtaining an audio sample, generating a representation of a keyword based on the audio sample, and generating a representation of a speaker based on the audio sample. The speaker can be associated with the keyword. A first similarity score can be determined based on a reference representation and one or more of the representation of the keyword and a representation of the speaker. The reference representation can be associated with one or more of the keyword and the speaker. A keyword spotting (KWS) output can be generated based on analyzing the first similarity score against at least a first threshold, wherein the KWS output accepts or rejects the audio sample as including a target keyword.

24 Claims, 7 Drawing Sheets

(56) References Cited

U.S. PATENT DOCUMENTS

2019/0043507 A1    2/2019  Huang et al.
2019/0392839 A1*  12/2019  Fujimura ................ G10L 15/16
2022/0157329 A1*   5/2022  Choi ...................... G06N 3/045
2022/0261218 A1*   8/2022  Shin ....................... G06F 3/165

OTHER PUBLICATIONS

Rikhye R., et al., "Multi-User Voicefilter-Lite via Attentive Speaker Embedding", 2021 IEEE Automatic Speech Recognition and Understanding Workshop, IEEE, Dec. 13, 2021, XP034076961, pp. 275-282, Abstract, paragraphs 1-3 figure 2.

* cited by examiner

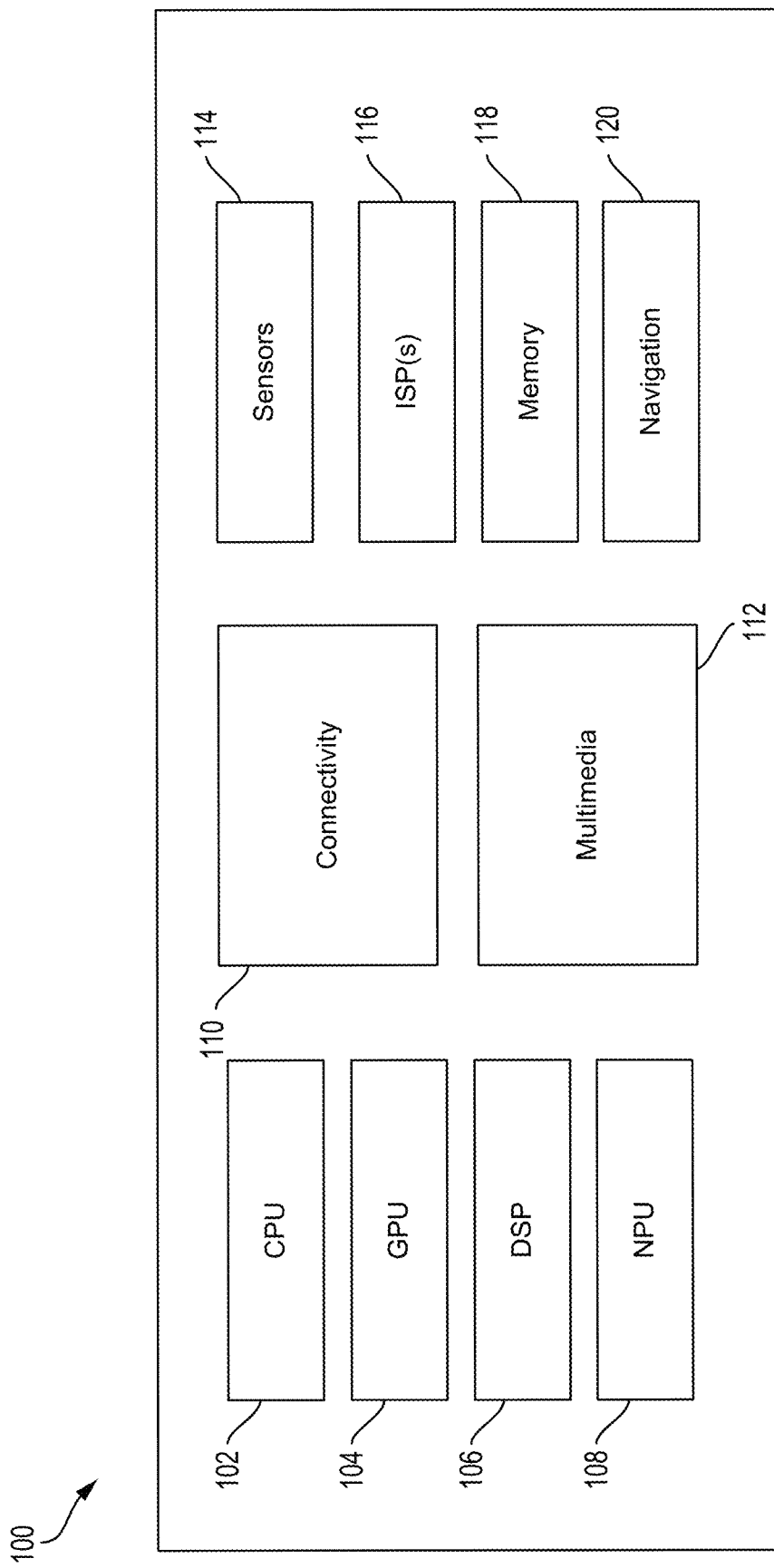

MULTI-TASK LEARNING FOR PERSONALIZED KEYWORD SPOTTING

CROSS-REFERENCE TO RELATED APPLICATIONS

This application claims the benefit of U.S. Provisional Application No. 63/322,164, filed Mar. 21, 2022, which is hereby incorporated by reference, in its entirety and for all purposes.

FIELD

The present disclosure generally relates to audio signal processing. For example, aspects of the present disclosure are related to systems and techniques for performing personalized keyword spotting (KWS) using one or more machine learning systems.

BACKGROUND

Electronic devices such as smartphones, tablet computers, wearable electronic devices, smart TVs, and the like are becoming increasingly popular among consumers. These devices can provide voice and/or data communication functionalities over wireless or wired networks. In addition, such electronic devices can include other features that provide a variety of functions designed to enhance user convenience. Electronic devices can include a speech recognition function for receiving voice commands from a user. Such a function allows an electronic device to perform a function associated with a voice command (e.g., a keyword) when the voice command from a user is received and recognized. For example, the electronic device may activate a voice assistant application, play an audio file, or take a picture in response to the voice command from the user.

In electronic devices having a speech recognition feature, manufacturers or carriers can often equip the devices with predetermined keywords and associated sound models, which may be used in detecting the keywords in an input sound. Some electronic devices may also allow a user to designate a keyword as a voice command. For example, electronic devices may receive several utterances of a keyword from a user and generate a keyword model for the designated keyword from the utterances. The detection performance of a keyword model can be related to the number of utterances from which the keyword model is generated. The detection performance of a keyword model may improve as the number of utterances increases. For example, a manufacturer may provide a keyword model in an electronic device that has been generated from thousands of utterances or more.

In some electronic devices, however, the number of utterances of a keyword received from a user is relatively small (e.g., less than five). Thus, the keyword model generated from such limited number of utterances may not produce adequate detection performance. However, receiving a substantial number of utterances from a user to generate a keyword model that can provide sufficient detection performance may be time consuming and inconvenient to the user.

SUMMARY

In some examples, systems and techniques are described for personalized keyword spotting through multi-task learning (PK-MTL). According at least one example, a method is provided for processing one or more data samples, the method including: obtaining an audio sample; generating a representation of a keyword, wherein the representation of the keyword is generated based on the audio sample; generating a representation of a speaker, wherein the speaker is associated with the keyword and the representation of the speaker is generated based on the audio sample; determining a first similarity score based on a reference representation and one or more of the representation of the keyword and the representation of the speaker, wherein the reference representation is associated with one or more of the keyword and the speaker; and generating a keyword spotting (KWS) output based on analyzing the first similarity score against at least a first threshold, wherein the KWS output accepts or rejects the audio sample as including a target keyword.

In another example, an apparatus for processing one or more data samples is provided that includes a memory (e.g., configured to store data, such as audio data, etc.) and one or more processors (e.g., implemented in circuitry) coupled to the memory. The one or more processors are configured to and can: obtain an audio sample; generate a representation of a keyword, wherein the representation of the keyword is generated based on the audio sample; generate a representation of a speaker, wherein the speaker is associated with the keyword and the representation of the speaker is generated based on the audio sample; determine a first similarity score based on a reference representation and one or more of the representation of the keyword and the representation of the speaker, wherein the reference representation is associated with one or more of the keyword and the speaker; and generate a keyword spotting (KWS) output based on analyzing the first similarity score against at least a first threshold, wherein the KWS output accepts or rejects the audio sample as including a target keyword.

In another example, a non-transitory computer-readable medium is provided that has stored thereon instructions that, when executed by one or more processors, cause the one or more processors to: obtain an audio sample; generate a representation of a keyword, wherein the representation of the keyword is generated based on the audio sample; generate a representation of a speaker, wherein the speaker is associated with the keyword and the representation of the speaker is generated based on the audio sample; determine a first similarity score based on a reference representation and one or more of the representation of the keyword and the representation of the speaker, wherein the reference representation is associated with one or more of the keyword and the speaker; and generate a keyword spotting (KWS) output based on analyzing the first similarity score against at least a first threshold, wherein the KWS output accepts or rejects the audio sample as including a target keyword.

In another example, an apparatus for processing one or more data samples is provided. The apparatus includes: means for obtaining an audio sample; means for generating a representation of a keyword, wherein the representation of the keyword is generated based on the audio sample; generating a representation of a speaker, wherein the speaker is associated with the keyword and the representation of the speaker is generated based on the audio sample; determining a first similarity score based on a reference representation and one or more of the representation of the keyword and the representation of the speaker, wherein the reference representation is associated with one or more of the keyword and the speaker; and generating a keyword spotting (KWS) output based on analyzing the first similarity score against at least a first threshold, wherein the KWS output accepts or rejects the audio sample as including a target keyword.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other objects and advantages associated with the aspects disclosed herein, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof:

FIG. 1 illustrates an example implementation of a System-on-a-Chip (SoC), in accordance with some examples;

DETAILED DESCRIPTION

Figure 2A:
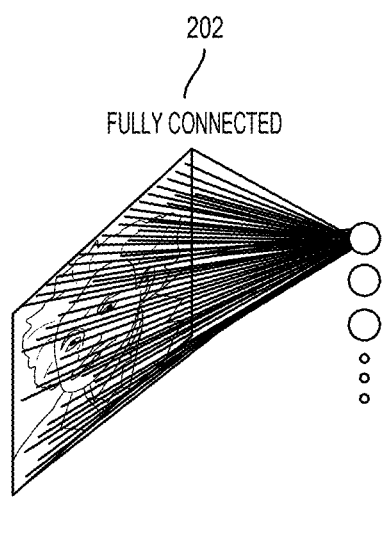
FIG. 2A and FIG. 2B illustrate an example of a fully connected neural network, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides example aspects, and is not intended to limit the scope, applicability, or configuration of the disclosure. Rather, the ensuing description of the exemplary aspects will provide those skilled in the art with an enabling description for implementing examples and aspects of the disclosure. It should be understood that various changes may be made in the function and arrangement of elements without departing from the spirit and scope of the application as set forth in the appended claims.

Voice activity detection can refer to the detection of a human voice by a computing device in order to perform some function. For example, a computing device can use voice activity detection, such as by the recognition of specific keywords, to wake or activate a device, to query a device, and/or to cause the device to perform various other functions. Voice activity detection can also be used in more complex functionalities, such as far-field voice detection (e.g., from a mobile device placed across a room), user identify verification (e.g., by voice signature), voice detection during other audio output (e.g., detecting a voice command while playing back music on a device or detecting an interrupting command while a smart assistant is speaking), and/or voice interaction in complex noise environments, such as within moving vehicles.

Keyword spotting (KWS) is a task of detecting one or more keywords in an audio signal (e.g., an audio signal including human speech or spoken words). For example, KWS can be used to distinguish an activation phrase or a specific command from other speech and noise in an audio signal. In some cases, KWS systems can target or be utilized by edge devices such as mobile phones and smart speakers. Detected keywords can include single words, compound words, phrases including multiple words, etc. In some cases, KWS can be performed based on a set of pre-determined keywords and/or a set of user-defined keywords. In some cases, user-defined keywords can include one or more adaptations, adjustments, etc., that are determined based on specific characteristics of a given user's voice or speech.

The audio signal can be a streaming audio signal and, in some examples, KWS can be performed for the streaming audio signal in real-time. A streaming audio signal can be recorded by or obtained from a microphone associated with a computing device. KWS can be performed locally or remotely. For example, KWS can be performed locally using one or more processors of the same computing device that collects or obtains the streaming audio signal. In some examples, KWS can be performed remotely by transmitting the streaming audio signal (or a representation thereof) from the local computing device to a remote computing device (e.g., the local computing device records an audio signal but offloads KWS processing tasks to a remote computing device). Performing KWS locally can result in a lower total latency or compute time but a decreased accuracy. Performing KWS remotely can result in a higher latency but an increased accuracy.

For example, local computing devices (e.g., smartphones) often have less computational power than remote computing devices (e.g., cloud computing systems) and therefore may generate KWS results with a lower accuracy or overall performance, particularly when subject to the time constraint associated with providing KWS results in real-time or near real-time. For example, local computing devices might implement KWS detection models with lower complexity than those implemented on remote computing devices in order to provide real-time KWS results. Lower accuracy KWS results can include false positives (e.g., identifying a keyword that is not actually present), false negatives (e.g., failing to identify a keyword that is present), and classification errors (e.g., identifying a first keyword as some other keyword).

However, performing KWS remotely can introduce a communication latency that may offset the accuracy gains associated with remote KWS. For example, remote KWS can introduce latency along the communication path from the local computing device to the remote computing device (e.g., the time to transmit the streaming audio signal or a representation thereof to the remote computing device) and along the return communication path from the remote computing device to the local computing device (e.g., the time to transmit the KWS results from the remote computing device back to the local computing device).

As mentioned above, in some examples, KWS is often performed in real-time (or approximately real-time) to allow user interaction with one or more computing devices. The lag between the time a user speaks a keyword (e.g., an activation phrase or specific command) and the time that the computing device provides a corresponding response or action can be an important factor in the user's willingness to utilize spoken commands. In some cases, a lag of multiple seconds may frustrate users or otherwise dissuade them from using spoken commands. As such, there is a need for improved KWS performance in local and/or remote KWS implementations, as both local and remote KWS implementations are often time-bound processes.

In some approaches to KWS, one or more machine learning networks are used to detect keywords in an audio signal based on a set of pre-defined keyword classifications. For example, KWS can be performed using one or more neural networks trained over the set of pre-defined keyword classifications. The resulting neural network(s) can achieve accurate performance when evaluated against a closed set of keywords that were seen in training, but are often limited to detecting only those keywords that were seen in training (e.g., keywords that correspond to a keyword classification in the training data set).

In some cases, few-shot KWS can be used to detect or classify keywords that were not originally seen in training. In an example FSL-based approach to KWS, a neural network classifier is trained on a training set that includes labeled samples representing various pre-defined classes or categories of keywords. During training, the neural network classifier absorbs knowledge from the labeled samples of the training set. For example, the neural network classifier can learn embeddings or an embedding space for relating the training samples to their corresponding labels. The trained neural network classifier can subsequently adapt or generalize (e.g., at inference) to evaluation tasks of new classes not seen in the training set (e.g., unseen classes).

For example, given only a small number of support examples for each new class, the FSL-based neural network classifier can use an attention mechanism over a learned embedding of the labeled set of support examples (e.g., the support set) to predict classes for unlabeled points (e.g., a query set). In a process of query-by-example, a trained FSL-based neural network classifier can receive a support set that includes M support examples for each of N unseen classes, and a query set that includes one or more query samples. The neural network classifier can determine a prototype representation for each unseen class N (e.g., using the M support examples associated with each unseen class N). Each unlabeled query sample can be classified into one of the previously unseen classes N based on a computed distance between the query sample and each prototype representation. In some cases, this inference process can be referred to as an N-way M-shot episode, where the goal of the FSL-based neural network classifier is to correctly classify a query set into N classes that are unseen during training but known using the M support samples.

In real-world scenarios in which KWS may be utilized, an input audio signal may naturally include utterances, words, phrases, etc., of unexpected novel classes whose support examples are not given. An unexpected novel class can be a class for which no support examples were included in the initial training set or the support set. These unexpected samples and/or classes can be referred to as an "open-set" (e.g., in contrast to the closed set of classes from the initial training set and the support set).

Neural network classifiers may exhibit over-confidence and incorrectly classify an unseen open-set sample into one of the FSL classes. In some examples, the accuracy and/or performance of a KWS system can be improved by rejecting open-set utterances rather than classifying them into one of the pre-determined keyword classifications (e.g., of the closed set). For example, Open-Set Recognition (OSR) can be used to detect unseen open-set classes and subsequently handle and/or reject query samples belonging to the detected open-set class.

Systems, apparatuses, processes (also referred to as methods), and computer-readable media (collectively referred to as "systems and techniques") are described herein for personalized keyword spotting (KWS) using multi-task learning (MTL). As described previously, KWS can be used to implement speech-based user interaction on various computing devices and/or smart devices. In some cases, a conventional KWS (C-KWS) system may concentrate on detecting user-agnostic predefined keywords. However, speech-based user interactions can come from or be otherwise associated with a target user (e.g., an owner) enrolled in the device. Described herein are systems and techniques for personalized keyword spotting through multi-task learning (PK-MTL) that can be used to further reduce detection errors. In some aspects, Target-user Biased KWS (TB-KWS) can be used to provide personalized KWS with reduced detection errors. In some aspects, Target-user Only KWS (TO-KWS) can be used to provide personalized KWS with reduced detection errors.

In one illustrative example, the systems and techniques described herein can implement or provide personalized keyword spotting through multi-task learning (PK-MTL). PK-MTL can include a multi-task learning portion and a task-adaptation portion, as will be described in greater depth below. In some aspects, multi-task learning can be used for keyword spotting and speaker verification to leverage user information (e.g., speaker characteristics) to the keyword spotting system. For example, a PK-MTL framework can include a shared encoder that generates features or embeddings based on receiving one or more utterances, sound samples, audio data, etc., as input. The output of the shared encoder can be provided to a first sub-network used to generate a keyword embedding (e.g., can be provided to a keyword sub-network or KWS sub-network). The output of the shared encoder can additionally be provided to a second sub-network used to generate a speaker embedding (e.g., can be provided to a speaker sub-network or SV sub-network).

In some examples, the keyword sub-network can be trained on or associated with a supervised keyword classification task. The speaker sub-network can be trained on or associated with a supervised speaker classification task. In some examples, a first cosine classifier can receive as input one or more keyword embeddings (e.g., from the keyword sub-network) and output one or more keyword classifications. A second cosine classifier can receive as input one or more speaker embeddings (e.g., from the speaker sub-network) and output one or more speaker classifications. In one illustrative example, a total loss function can be used to train the PK-MTL described herein, wherein the total loss function includes the loss for the supervised keyword classification task and the loss for the supervised speaker classification task.

In some cases, a Score Combination Module and/or a Task Representation Module can be used to fully adapt the multi-task learning architecture to personalized KWS scenarios (e.g., such as the TB-KWS scenario and the TO-KWS scenario). In some aspects, PK-MTL can be used to selectively conduct TB-KWS and TO-KWS while achieving comparable or better results on the original C-KWS scenario. In some examples, the systems and techniques can be used to implement a personalized KWS system with reduced false alarm rate in practical keyword spotting scenarios.

For example, a Score Combination Module (SCM) can be used to determine a linear combination of two scores, based at least in part on one or more keyword embeddings and speaker embeddings. Personalized keyword spotting based on the linear combination determined by the SCM can be associated with a reduced false alarm rate. In some examples, keyword embeddings and speaker embeddings from the two respective sub-networks can be used to determine one or more task-specific embeddings for each task by a learnable Task Representation Module (TRM). Personalized keyword spotting based on the task-specific embeddings can be associated with a reduced false alarm rate.

Various aspects of the present disclosure will be described with respect to the figures. FIG. 1 illustrates an example implementation of a system-on-a-chip (SoC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures, speech, and/or other interactive user action(s) or input(s). In one implementation, the NPU is implemented in the CPU 102, DSP 106, and/or GPU 104. The SoC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

In some examples, the one or more sensors can include one or more microphones for receiving sound (e.g., an audio input), including sound or audio inputs that can be used to perform keyword spotting (KWS) as described herein. In some cases, the sound or audio input received by the one or more microphones (and/or other sensors) may be digitized into data packets for analysis and/or transmission. The audio input may include ambient sounds in the vicinity of a computing device associated with the SoC 100 and/or may include speech from a user of the computing device associated with the SoC 100. In some cases, a computing device associated with the SoC 100 can additionally, or alternatively, be communicatively coupled to one or more peripheral devices (not shown) and/or configured to communicate with one or more remote computing devices or external resources, for example using a wireless transceiver and a communication network, such as a cellular communication network.

The SoC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SoC 100 and/or components thereof may be configured to perform audio signal processing using one or more machine learning networks and/or machine learning techniques according to aspects of the present disclosure and as described herein. For example, SoC 100 and/or components thereof may be configured to perform keyword spotting according to aspects of the present disclosure. In some examples, by using one or more neural network classifiers to perform few-shot learning (FSL) and/or open-set recognition (OSR), aspects of the present disclosure can increase the accuracy and/or efficiency of keyword spotting (KWS).

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as speech analysis, audio signal analysis, image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2B:
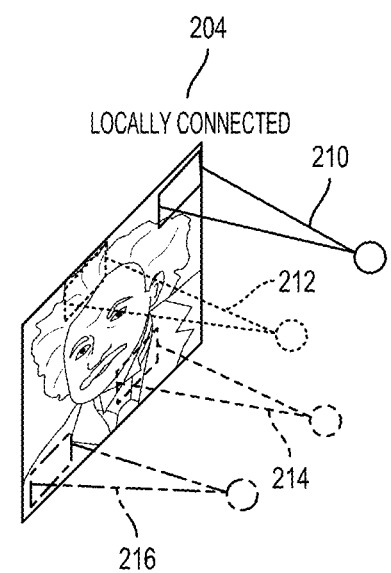

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As noted above, systems and techniques are described herein for personalized keyword spotting (KWS). Keyword spotting (KWS) can be used to implement speech-based user interaction on various computing devices and/or smart devices. In some cases, a conventional KWS (C-KWS) system may concentrate on detecting user-agnostic predefined keywords. However, many speech-based user interactions can come from or be otherwise associated with a target user (e.g., an owner) enrolled in the device. Described herein are systems and techniques for improved personalized KWS that can be used to further reduce detection errors. In some aspects, Target-user Biased KWS (TB-KWS) can be used to provide personalized KWS with reduced detection errors. In some aspects, Target-user Only KWS (TO-KWS) can additionally, or alternatively, be used to provide personalized KWS with reduced detection errors.

In one illustrative example, the systems and techniques described herein can implement or provide personalized keyword spotting through multi-task learning (PK-MTL) on keyword spotting and speaker verification, which can allow the systems and techniques to leverage user information to the keyword spotting system. PK-MTL can include a multi-task learning portion and a task-adaptation portion, as will be described in greater depth below.

Task-specific modules for TB-KWS and TO-KWS can be constructed independently. The task-specific modules can be trained using episodes that mimic the test case of each task, as will also be described in greater depth below. In some examples, a Score Combination Module and/or a Task Representation Module can be used to fully adapt the multi-task learning architecture to personalized KWS scenarios (e.g., such as the TB-KWS scenario and the TO-KWS scenario). PK-can be used to selectively conduct TB-KWS and TO-KWS while achieving comparable or better results on the original C-KWS scenario. In some examples, the systems and techniques can be used to implement a personalized KWS system with reduced false alarm rate in practical keyword spotting scenarios.

In some cases, always-on lightweight keyword spotting systems can be used to wake up smart audio devices. For example, when a keyword is detected by the system, the audio stream including the detected keyword (or the audio stream following the detected keyword) can be uploaded or otherwise provided to one or more speech recognition systems. Conventional keyword spotting (C-KWS) aims to detect small sets of pre-defined speech signals from any speakers and is therefore speaker-agnostic (e.g., does not consider the identity of the speaker). C-KWS is often used in always-on keyword spotting systems. In some example, the use of C-KWS in always-on keyword spotting systems for personal devices can produce high false alarm rates.

Figure 3:
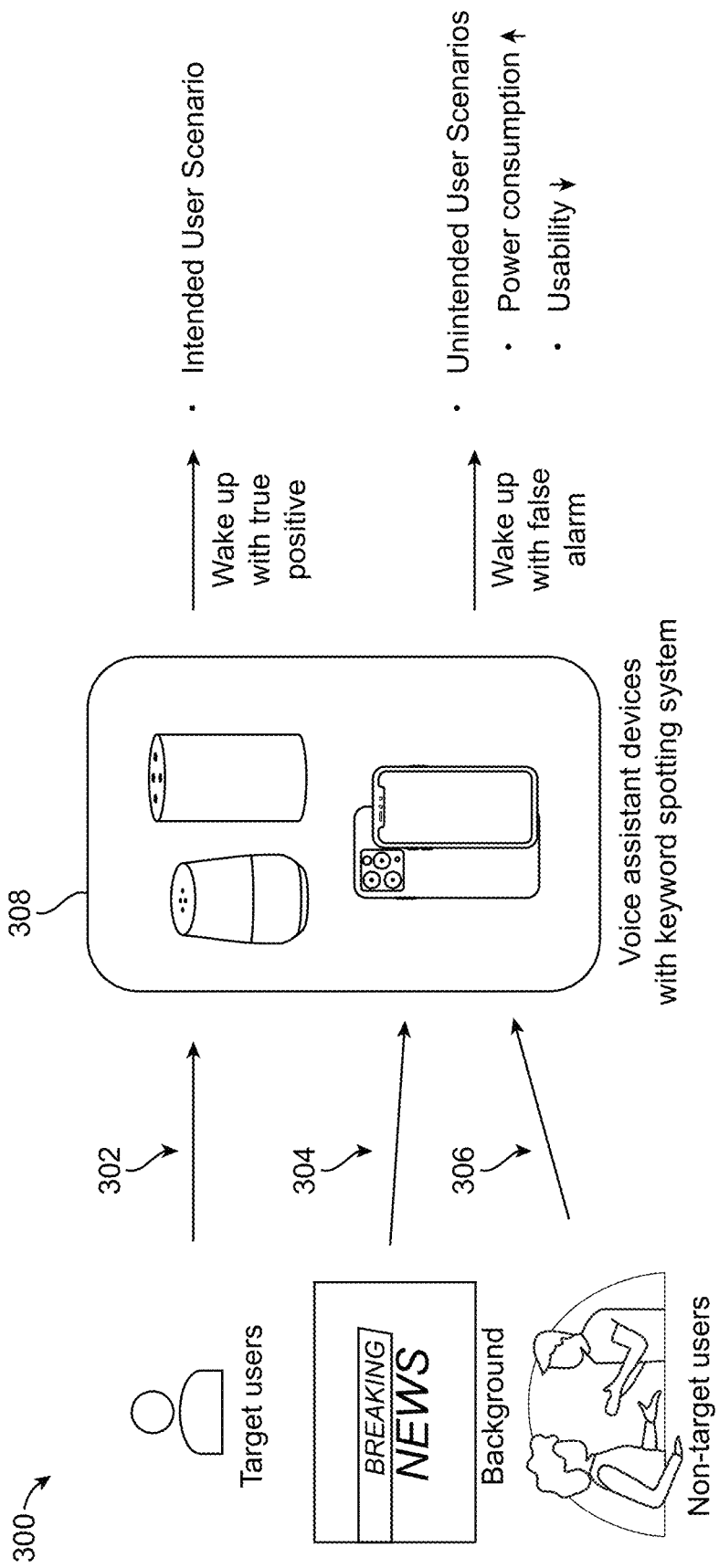
FIG. 3 is a diagram illustrating an example keyword spotting (KWS) scenario, in accordance with some examples.

In some examples, the majority of user interactions may come from a target user. In some examples, existing speech recognition systems may require user interactions to come from a target user enrolled in the device. In some cases, speech recognition systems can require a target used to be explicitly enrolled in the device. However, C-KWS may not reflect this requirement. In some examples, performance of a C-KWS system can be degraded in various scenarios. FIG. 3 is a diagram 300 illustrating various scenarios in which a keyword spotting system can operate, including a desired usage scenario in which target user speech with a keyword causes an electronic device to wake up with a true positive. FIG. 3 also illustrates scenarios in which a keyword spotting system may operate in an undesired usage scenario, such as when streaming audio 304 from TV, audio 306 for online meetings, audio 302 from conversations, etc., are continuously feeding into an always-on keyword spotting system 308 that causes an electronic device to wake up with one or more false alarms. For example, the streaming audio 304 might contain various words, including target keywords or keywords having similar pronunciation to a target keyword of the C-KWS system (e.g., which is speaker-agnostic and does not consider the identity of a speaker). There is a need for more practical, personalized keyword spotting with a lower false alarm rate. In one illustrative example, the systems and techniques described herein can be used to perform personalized keyword spotting (and/or personalized keyword spotting tasks) by recognizing keywords depending on the user(s). This process can reduce power consumption while maintaining a high recall rate and low false alarm rate.

Figure 4A:
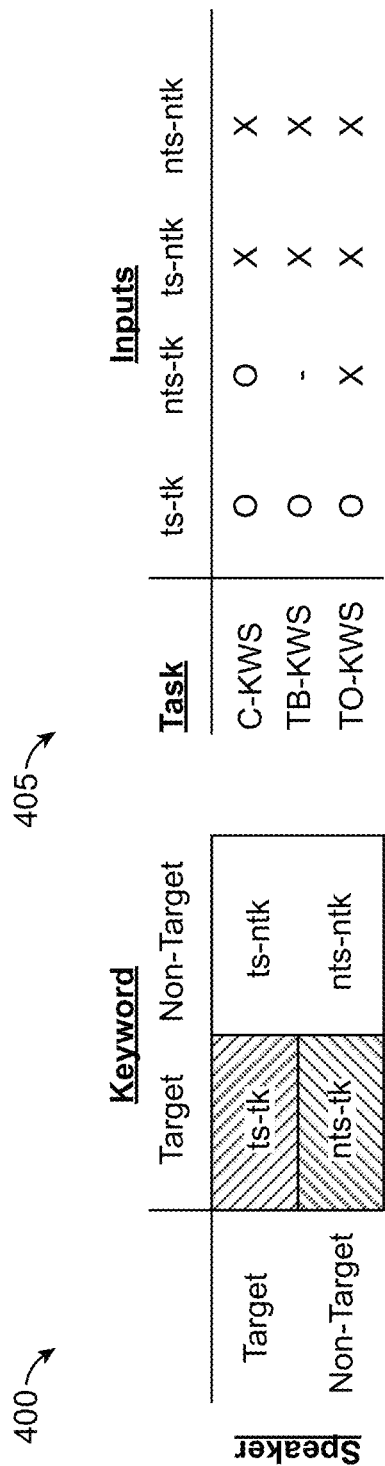
FIG. 4A is a diagram illustrating an example categorization that can be applied to the inputs of a keyword spotting system, in accordance with some examples.

FIG. 4A is a diagram illustrating an example categorization 400 that can be applied to the inputs of a keyword spotting system. For example, the table on the left side of FIG. 4A depicts an example categorization with four categories. In some examples, inputs of the KWS system can be categorized into four categories, based on whether the speaker is a target speaker or a non-target speaker and whether the keyword is a target keyword or a non-target keyword. As depicted in FIG. 4A, the four categories are "ts-tk" (utterances from the target speaker that include the target keyword), "nts-tk" (utterances from a non-target speaker that include the target keyword), "ts-ntk" (utterances from the target speaker that include a non-target keyword) and "nts-ntk" (utterances from a non-target speaker that include a non-target keyword).

In some cases, the category "nts-tk" can be the most ambiguous or vague, as the "nts-tk" category represents utterances whose keyword is the target to detect but come from a non-target user. In one illustrative example, the two personalized keyword spotting tasks described herein can be used to analyze the "nts-tk" category of utterances in an improved manner. For example, the Target user Biased KWS (TB-KWS) and the Target user Only KWS (TO-KWS) described herein may consider "nts-tk" utterances differently in order to better concentrate on the target user.

In one illustrative example, TB-KWS may implement a model that is biased to the target user. For example, by biasing the model to the target user, TB-KWS does not explicitly consider the utterances with the target keywords when coming from non-target users (e.g., does not explicitly consider the "nts-tk" category of utterances).

In another illustrative example, TO-KWS can be used to detect only the utterances containing the target keywords when coming from the target user. For example, TO-KWS can detect only the "ts-tk" category of utterances and not the "nts-tk" category. In some cases, TO-KWS can be used in scenarios in which some applications in smart devices prefer to be activated only on the target keywords from the device's target user.

FIG. 4A also includes a table 405 depicting the application of C-KWS, TB-KWS, and TO-KWS to the four categories of utterances described above. In the right-hand-side table, an entry of 'O' indicates a positive; an entry of '–' indicates a neutral; and an entry of 'X' indicates a negative. For example, it can be seen that TB-KWS considers the "nts-tk" category of utterances as neutral and that TO-KWS consider the same "nts-tk" category of utterances as negative. Additionally, it can be seen that C-KWS considers the "nts-tk" category of utterances as positive—the three KWS approaches each consider utterances with target keywords from non-target users (e.g., the "nts-tk" category) differently.

Figure 4B:
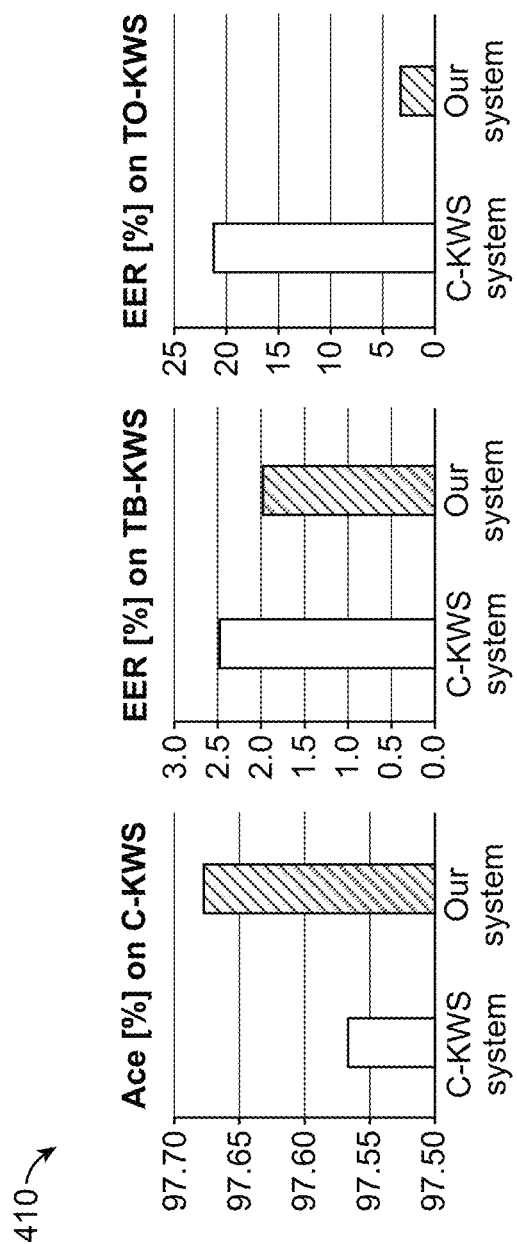
FIG. 4B is a diagram illustrating an example accuracy percentage of keyword spotting (KWS) systems on conventional KWS (C-KWS) tasks, target-user biased KWS (TB-KWS) tasks, and target-user only KWS (TO-KWS) tasks, in accordance with some examples.

FIG. 4B is a diagram with graphs 410 illustrating example accuracy percentages of different KWS systems on C-KWS tasks (e.g., left panel), TB-KWS tasks (e.g., middle panel), and TO-KWS tasks (e.g., right panel). As depicted in FIG. 4B, a C-KWS system can demonstrate high accuracy on C-KWS tasks but demonstrates deteriorating performance on the two personalized tasks (e.g., TB-KWS and TO-KWS), as seen by the increased EER percentage. In some examples, the systems and techniques described herein can be used to provide improved TB-KWS and TO-KWS while performing C-KWS with a comparable or better result than a C-KWS system.

The systems and techniques described herein can be used to perform personalized keyword spotting through multi-task learning (PK-MTL) and implement an always-on lightweight keyword spotting system that can be selectively utilized on all three of the C-KWS, TB-KWS, and TO-KWS tasks. The PK-MTL described herein can leverage user information to the keyword spotting system. In some examples, a PK-MTL framework can be applied to fully adapt to the personalized tasks of TB-KWS and TO-KWS, based at least in part on a Score Combination Module (SCM) and a Task Representation Module (TRM).

The systems and techniques can include a PK-MTL implemented as a two-stage system including a multi-task learning system and a task-adaptation system. In one illustrative example, multi-task learning can first be applied on keyword spotting and speaker verification to leverage speaker information to the keyword spotting system. For parameters and computational efficiency, the systems and techniques and/or the PK-MTL described herein can use a hard parameter sharing scheme that shares all parameters in low-level layers, which also helps in learning (e.g., during training) complementary information from another task. In some examples, the PK-MTL described herein can obtain keyword and/or speaker representations in a computationally efficient manner.

Next, task-specific functions can be introduced to fully adapt the keyword representations and the speaker representations to TB-KWS and TO-KWS. In some cases, because the purpose of the three tasks (e.g., C-KWS, TB-KWS, and TO-KWS) may be different, a function that combines the information from keyword representations and speaker representations suitable to each task can be utilized. For example, the Score Combination Module (SCM) and Task Representation Module (TRM) can be used as task-specific functions.

In some examples, the SCM can include an optimization-free approach that combines similarity scores from keyword representations and speaker representations directly. The optimization-free SCM approach can provide the capability for the network (e.g., a machine learning network or keyword spotting system, etc.) to perform TB-KWS and TO-KWS.

In some examples, a second approach can include constructing a trainable Task Representation Module (TRM) that is designed to take two representations and extract new task-specific representation for each task. For example, TRM can be trained with metric learning loss on a batch construction method that mimics the test case of each task (e.g., for TO-KWS, "ts-tk" utterances are positive and the other three categories of utterances are negatives). In some examples, the use of the TRM can cause the final embeddings of positive samples to cluster closer together and can cause the final embeddings of negative samples to be far apart.

In some examples, the systems and techniques described herein can be evaluated on the Google Speech Commands dataset. Using multiple keyword spotting backbones, the PK-MTL described herein can improve performance on TB-KWS and TO-KWS, while providing comparable results on C-KWS. In some examples, the systems and techniques described herein can be tested in a realistic setting in which negative samples are continuously coming from TVs and other noises and/or noise sources. In one illustrative example, WSJ-SI200 and Librispeech can be used as negative samples to reduce the false alarm rate, based on speaker representation(s).

Figure 5A:
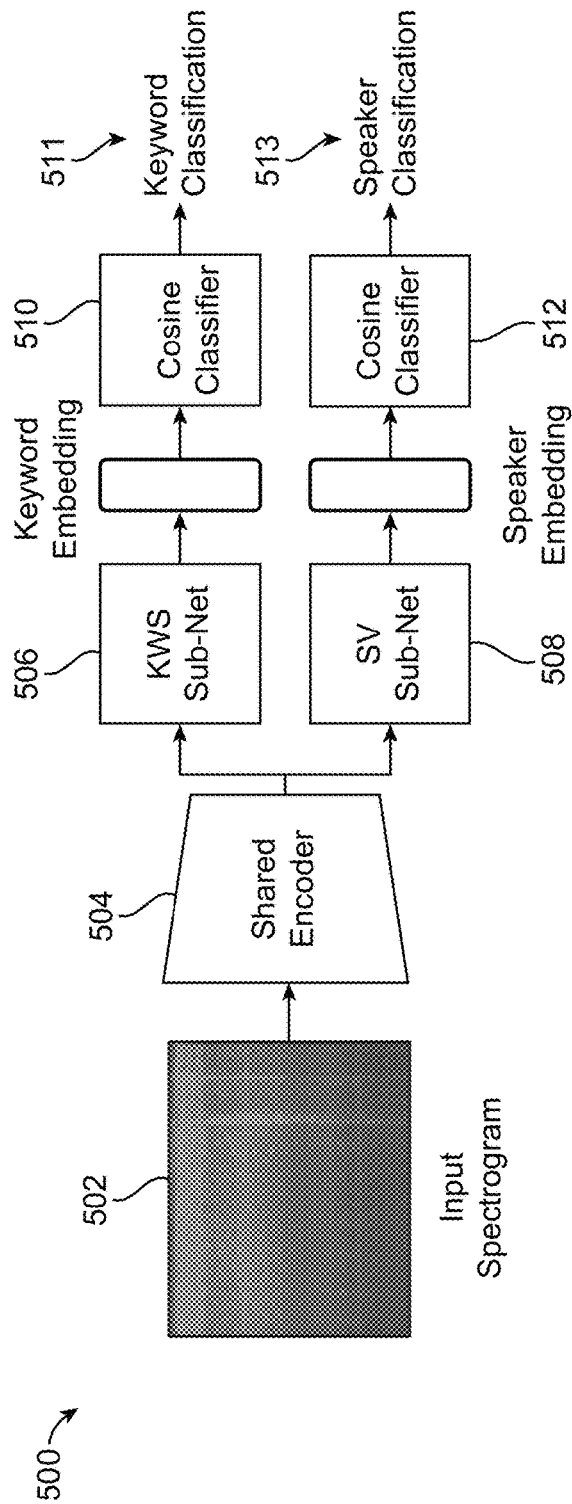
FIG. 5A is a diagram illustrating an example architecture of a personalized keyword spotting through multi-task learning (PK-MTL) network, in accordance with some examples.
Figure 5B:
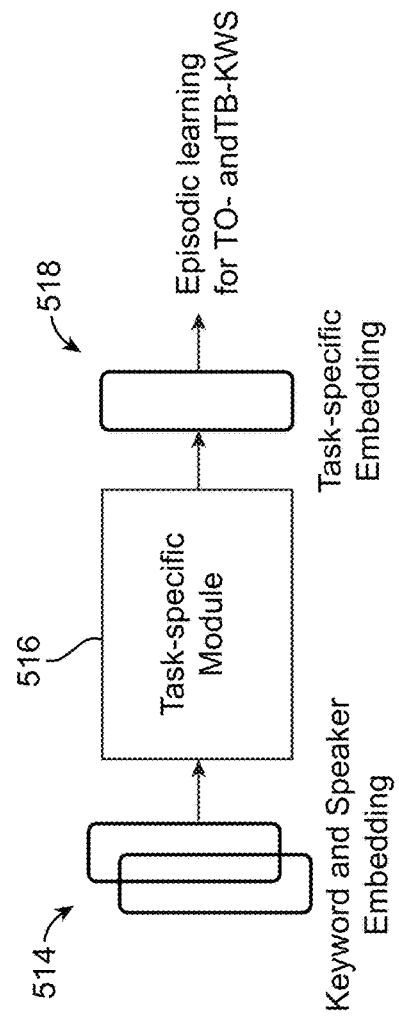
FIG. 5B is a diagram illustrating an example architecture of a task-specific module for episode learning for TO-KWS and TB-KWS tasks, in accordance with some examples.

FIGS. 5A and 5B illustrate an example architecture according to the systems and techniques described herein. In some cases, a two-part architecture can be used, including a multi-task learning on keyword spotting (KWS) architecture and speaker verification (SV) portion and one or more task-specific functions to adapt to personalized KWS scenarios. For example, FIG. 5A illustrates an example multi-task learning framework 500, including a shared encoder 504 that receives an input spectrogram 502 as input. A shared representation of keyword spotting and speaker verification can be encoded in low-level layers by the shared encoder 504. Sub-networks, including a KWS sub-network 506 and an SV sub-network 508, can be used to learn the characteristics of each task in high-level features. In some examples, cosine classifiers, including cosine classifier 510 and cosine classifier 512, can be trained to classify the keyword classes 511 and speaker classes 513, as will be described in greater depth below.

FIG. 5B illustrates an example of task-specific functions. As shown, the learned keyword and speaker embeddings 514 are fully adapted to TB-KWS and TO-KWS by a task-specific module 516, which performs by task-specific functions to generate task-specific embeddings 518.

In some examples, the training data, $D_{train}$, can include labeled samples, $\{(x_i, y_i)\}_{i=1}^{D_{train}}$, where $x_i$ is an input audio feature, and $y_i = (y_i^k, y_i^s)$. For example, $y_i^k$ and $y_i^s$ can represent the corresponding keyword and speaker labels, respectively. In some cases, to leverage speaker characteristics to the keyword spotting system, the multi-task learning architecture of FIG. 5A can include a shared encoder $f_\phi(\cdot)$; one or more subnetworks for keyword spotting and speaker verification, $f_\varphi^k(\cdot)$ and $f_\varphi^s(\cdot)$, respectively; and classifiers, $g^k(\cdot)$ and $g^s(\cdot)$.

As described previously, the systems and techniques described herein can be used to implement personalized keyword spotting that using keyword and speaker information. In some examples, for a given backbone network, $f_\theta(\cdot)$, where $\theta = \{\phi, \varphi\}$, hard-parameter sharing can be used for low-level layers (e.g., the shared encoder, $f_\phi(\cdot)$ illustrated in FIG. 5A). In some examples, the shared encoder can learn complementary information of both KWS and SV, and the shared representation is efficient from the standpoint of memory and computational complexity compared to separate task design.

In some cases, features for KWS and SV may be adversarial to each other in high-level concept (e.g., keyword features are speaker-agnostic and vice versa), the sub-networks, $f_\varphi^k(\cdot)$ and $f_\varphi^s(\cdot)$ can be used to learn the characteristics of each task. For example, the 'KWS Sub-Net' illustrated in FIG. 5A can be the same as or similar to the sub-network $f_\varphi^k(\cdot)$ and the 'SV Sub-Net' illustrated in FIG. 5A can be the same as or similar to the sub-network $f_\varphi^s(\cdot)$, as mentioned previously.

In one illustrate example, keyword and speaker features (e.g., embeddings) can be obtained from the respective one of the two sub-networks. For example, keyword features (e.g., keyword embeddings) can be determined as $z_i^k = f_\varphi^k (f_\phi(x_i))$ and speaker features (e.g., speaker embeddings) can be determined as $z_i^s = f_\varphi^s(f_\phi(x_i))$. In some examples, the keyword features and speaker features can both be generated based on an output from the shared encoder $f_\phi(\cdot)$, wherein the keyword features $z_i^k$ are generated by providing the shared encoder output $f_\phi(x_i)$ to the KWS sub-network $f_\varphi^k$. Similarly, the speaker features $z_i^s$ can be generated by providing the shared encoder output $f_\phi(x_i)$ to the SV sub-network $f_\varphi^s(\cdot)$.

The keyword features $z_i^k$ and the speaker features $z_i^s$ can be provided as input to one or more cosine classifiers, shown in FIG. 5A as a pair of cosine classifiers with one cosine classifier for each of the two sub-networks (e.g., a first cosine classifier for the keyword sub-network and a second cosine classifier for the speaker sub-network). In one illustrative example, the cosine similarity-based classifiers can be applied as:

$$g^k(z_i^k) = \text{softmax}(s \cdot \text{sim}(z_i^k, W^k) + b) \qquad \text{Eq. (1)}$$

$W^k$ is a learnable weight for keyword classification, sim represents cosine similarity, $\text{sim}(a, b) = a \cdot b / (\|a\|\|b\|)$, and s and b indicate scale and bias scalar parameters, respectively.

A keyword classification loss can be determined by minimizing the negative log probability of the true class:

$$L_k = \sum_i - y_i^k \log g^k(z_i^k) A$$
$$L_k = \sum_i - y_i^k \log g^k(z_i^k)$$
Eq. (2)

In some examples, a speaker classification loss, $L_s$, can be determined for the speaker sub-network branch in the same manner as above in Eq. (2) for the keyword sub-network branch. Combining the keyword classification loss and the speaker classification loss (e.g., combining the two task-specific loss functions) gives:

$$L_{mtl} = L_k + \lambda L_s$$
Eq. (3)

Here, $\lambda$ is a parameter that can be used to indicate the importance of speaker information. In one illustrative example, the PK-MTL architecture described herein can be trained according to the loss function given above in Eq. (3). Described below are examples of the use of learned representations for TB-KWS and TO-KWS.

In some examples, keyword and speaker scores can first be obtained in a test phase and used for a decision about accepting or rejecting claimed utterances based on a predefined threshold. For example, assume that an enroll utterance $x_{ref}$ of a target user $y_t^s$ is offered or otherwise obtained. Then, keyword and speaker scores of the test input sample $x_i$ for the same target user $y_t^s$ can calculated as:

$$\psi_{i,ref}^k = \text{sim}(z_i^k, W_{ref}^k)$$
Eq. (4.1)

$$\psi_{i,ref}^s = \text{sim}(z_i^s, f_\varphi^s(f_\phi(x_{ref})))$$
Eq. (4.2)

Here, $\psi_{i,ref}^k$ is the cosine similarity score between the keyword embedding $z_i^k$ and the classifier weight of the target keyword $W_{ref}^k$, where $W_{ref}^k$ is the learnable weight in the keyword classifier and the trained weight can be regarded as the most representative keyword embedding. $\psi_{i,ref}^s$ is the cosine similarity score between the speaker embedding of the input $z_i^s$ and the enrolled target user $f_\varphi^s(f_\phi(x_{ref}))$. It is noted that in some examples, target keywords can be predefined, but speakers are not overlapped between training and test and the reference embedding from the target user can be utilized in the test phase. Described below are two example approaches to adapt the learned PK-MTL architecture to TB-KWS or TO-KWS scenarios, respectively.

As described previously, in one illustrative example a Score Combination Module (SCM) can be used to combine two scores, $\psi^k$ and $\psi^s$, directly. An objective of keyword spotting can be to minimize the false rejection rate (FRR) at a given false alarm rate (FAR). Here, FAR can be given as the percentage of instances in which negative samples are incorrectly accepted, while FRR can be given as the percentage of instances in which positive samples are incorrectly denied. In some cases, the systems and techniques described herein can minimize the FRR at a given FAR by choosing $\text{SCM}(\cdot,\cdot;\alpha)$ as follows:

$$\alpha^* = \arg\min_\alpha \text{FRR}(\text{SCM}(\psi^k, \psi^s; \alpha)), \text{ s.t. FAR} = c$$
Eq. (5.1)

Here, $\alpha$ represents the parameters of SCM for combining two scores, and c (%) represents the target FAR percentage.

$\text{SCM}(\cdot,\cdot;\alpha)$ can be provided as various functions. For example, in some cases $\text{SCM}(\cdot,\cdot;\alpha)$ can be a linear combination function:

$$\text{SCM}(\psi^k, \psi^s; \alpha) = \alpha \cdot \psi^k + (1-\alpha) \cdot \psi^s$$
Eq. (5.2)

In some examples, it is noted that the parameter $\alpha$ can be used to represent an importance weight for keyword spotting on each task. In some examples, the parameter $\alpha$ can be selected from a grid search on the validation set.

In one illustrative example, a Task Representation Module (TRM) can be utilized, wherein the TRM includes one or more trainable neural networks. For example, the systems and techniques can utilize a trainable neural network, $\text{TRM}_{TB}(\cdot,\cdot)$ and $\text{TRM}_{TO}(\cdot,\cdot)$, whose inputs are keyword and speaker embeddings and an output is a task-specific embedding. As mentioned previously, FIG. 5B illustrates an example architecture including a task-specific module that generates a task-specific embedding based on receiving one or more keyword and speaker embeddings as input. In some examples, the keyword embeddings and/or speaker embeddings utilized by the task-specific module of FIG. 5B can be the same as or similar to the keyword and speaker embeddings from the multi-task learning framework illustrated in FIG. 5. Returning to FIG. 5B, in some examples the keyword and speaker embeddings can be provided as input to a task-specific module that includes one or more task-specific functions for fully adapting the learned keyword and speaker embeddings to TB-KWS and TO-KWS. For example, the task-specific embedding(s) generated by the task-specific module can be used to perform episodic learning for TO- and TB-KWS, as illustrated in FIG. 5B.

In some examples, the TRM can be trained to form discriminative embeddings in terms of TB-KWS and TO-KWS. For example, metric learning objectives (e.g., a metric learning loss) for TB-KWS and TO-KWS can be utilized to force the modules to form discriminative embeddings in terms of TB-KWS and TO-KWS. In some cases, the metric learning objective and/or metric learning loss can be applied with a batch construction mimicking the test case of each task.

As illustrated in the right-side panel of FIG. 4A, positive and negative sample pairs can be defined for each task (e.g., with a positive pair represented as an open circle 'O' in FIG. 4A and a negative pair represented as an 'X'). In some examples, positive and negative sample pairs can be defined based on the anchor sample in a minibatch, with a goal of forcing the positive samples to be closer together and the negative sample to be farther apart.

Each mini-batch can include a prototype set and a query set. The distance (e.g., similarity) between prototypes and query samples can be measured as follows:

$$\psi_{i,j} = \text{sim}(\text{TRM}(z_i^k, z_i^s), \text{TRM}(p_j^k, p_j^s))$$
Eq. (6)

Here, the learnable classifiers' weights $W_j^k$ and $W_j^s$ can be used as the prototypes $p_j^k$ and $p_j^s$, respectively, in training. $p_j^k$ is the prototype of the corresponding keyword of j-th sample. It is noted that z and p can be obtained from a test sample and a reference sample in test time, respectively. A task-specific loss function can then be defined as follows:

$$L_{metric} = -\frac{1}{N} \sum_{i=1}^{N} \frac{\exp(s \cdot \psi_{i,i} + b)}{\sum_{j=1}^{N} \exp(s \cdot \psi_{i,j} + b)}$$
Eq. (7)

$$L_{metric} = -\frac{1}{N}\sum_{i=1}^{N}\frac{\exp(s \cdot \psi_{i,i} + b)}{\sum_{j=1}^{N}\exp(s \cdot \psi_{i,j} + b)}$$

In some examples, the same task-specific loss function (e.g., Eq. (7)) can be used for TB-KWS and TO-KWS. In some cases, mini-batch construction methods can be different for TB-KWS and TO-KWS. For example, in the case of TB-KWS, target keywords from non-target users are not chosen for batch construction. Through the objective function, the task-specific modules can extract discriminative features for each task. In one illustrative example, the multi-task learning architecture with TRM, as described herein, can be referred to as PK-MTL (e.g., personalized keyword spotting through multi-task learning).

Described below is an example experimental setup and experimental results. For example, conventional and personalized KWS systems can be evaluated on the Google Speech Commands v1 dataset, which contains 64,727 utterances of 30 words from 1,881 speakers. A conventional 12 class classification setting can be used, which consists of ten classes of "Yes", "No", "Up", "Down", "Left", "Right", "On", "Off", "Stop", and "Go" with two additional classes "Unknown" and "Silence", which indicate the remaining twenty words and no speech, respectively. Each utterance is one second in length and the sampling rate is 16 kHz. The dataset can be divided into training, validation, and testing sets, and the "Unknown" and "Silence" classes can be re-balanced in the division. The standard testing set can be used for evaluation. In one illustrative example, for TB-KWS and TO-KWS, sample-to-sample pairs can be generated to include positive and negative pairs using the samples in the test set. In some cases, an anchor sample can be randomly selected and ts-tk, nts-tk, ts-ntk, and nts-ntk samples (e.g., as described with respect to FIG. 4A) can be chosen from anchor. To reduce the variation of the performance, 10 test splits can be obtained where each test split contains 16,000 sample-to-sample pairs. In some cases, the experimental results can be reported based on the average performance from 10 test splits. Note that in some cases, "Silence" and "Unknown" keywords can be selected for non-target keywords, but not for target keywords.

In some examples, the KWS systems can be evaluated on a realistic scenario. For example, a scenario can be simulated in which speech is continuously coming from news broadcasts or conversations containing lots of words (e.g., sources that are general negatives for a KWS system). In some cases, the WSJ-SI200 and Librispeech datasets can be used as negatives. Negative samples from WSJ-SI200 can be segmented from the whole audio stream into one-second-long portions. For Librispeech, the entire audio stream can be segmented into one-second-long portions in the public clean and noisy test set.

In some examples, three keyword spotting architectures can be used as a backbone network (e.g., BC-ResNet, Res15, and/or DS-ResNet) for the PK-MTL described herein. For BC-ResNet, input features of 40-dimensional log Mel spectrograms with 30 ms window length and 10 ms frameshift can be used, with one or more data augmentations applied (e.g., time shift, background noises, SpecAugment). For Res15 and DS-ResNet, noise and random shift can be added to each segment. In some aspects, 40-dimensional Mel-frequency cepstrum coefficient features can then be extracted and used as inputs. The PK-MTL can include the shared encoder and sub-networks for KWS and SV, as illustrated in FIG. 5A and described previously above. The shared encoder can be designed using the full backbones except the last two conv layers for BC-ResNet and the last conv block for Res15 and DS-ResNet. In some examples, the KWS and SV sub-networks can be provided downstream of the shared encoder and can include the remaining layers of each backbone and an additional fully connected layer. The official training strategy of each baseline (e.g., backbone) network can be utilized (e.g., a learning rate, an optimization method, and a mini-batch size, respectively). In some examples, the parameter A in Eq. (3) can be set to 0.1. For the baselines (e.g., BC-ResNet, Res15, and DS-ResNet), an additional fully connected layer can be added before the classifier, and the classifier can be changed to the cosine classifier (e.g., the cosine classifiers described above with respect to FIG. 5A). In some examples, these modifications can improve performance with additional parameters and computational cost.

In one illustrative example, the Score Combination Module (SCM) can be defined as a linear combination function and its parameter can be selected on the validation set where target FAR c is set to 1%. For the Task Representation Module (TRM), task-specific modules that are composed of two fully connected layers can be added. To reduce the model size, the intermediate feature size can be set to 2. The modules can be trained for 50 epochs using the same training strategy described above with respect to learning the PK-MTL architecture.

In some examples, ablation studies can be performed on C-KWS, TB-KWS, and TO-KWS. For example, four methods can be compared (e.g., Vanilla, Naive MTL, Sep. w/SCM, and the PK-MTL described herein) to analyze the impact of leveraging speaker information to keyword spotting systems. Vanilla only uses the loss function for keyword spotting. The multi-task learning framework described herein, but without the inclusion of task-specific functions (e.g., those described with respect to FIG. 5B), is denoted as Naive MTL. Sep. indicates utilizing keyword and speaker representations from two separate networks (e.g., KWS and SV networks). In Table 1, Naive MTL can conduct both KWS and SV tasks with a marginal increase in computational cost, and can also be seen to boost the performance about keyword spotting (e.g., C-KWS and TB-KWS), by learning complementary information from SV. Sep. w/SCM can require significant computation due to solving one task per forward pass. Compared to Sep., the systems and techniques described herein can exploit hard parameter sharing of most parts of the network for KWS and SV, which can significantly reduce the computational cost. The PK-MTL described herein can be seen to significantly outperform on TB- and TO-KWS with approximately the same number of parameters, while being associated with a much small computational footprint or overhead than Sep. w/SCM.

With a simple score combination function, PK-MTL w/SCM largely boosts the performance of TB-KWS and TO-KWS compared to Naïve MTL. However, it has limited performance improvements because the representations cannot learn task-specific characteristics explicitly. Through TRM (e.g., Task Representation Module(s)), PK-MTL can fully adapt keyword and speaker representations to TB-KWS and TO-KWS, and Table 1 shows that it outperforms other comparisons on all metrics.

In one illustrative example, the PK-MTL framework described herein can be applied to one or more existing conventional keyword spotting architectures. For example, as depicted in Table 1, PK-MTL based on all three backbones, BC-ResNet, Res15, DS-ResNet, improves the performance of C-KWS as well as TB-KWS and TO-KWS with the aid of the speaker representations and the presently described TRM modules. The performance of SV and the influence of SV information to KWS may be different depending on the baseline structure and size, but PK-MTL outperforms the baselines consistently on all tasks.

As mentioned previously, KWS systems can be evaluated on a realistic scenario, such as a simulated scenario in which speech is continuously coming from news streams or conversations including words that are general negatives for a KWS system. In one illustrative example, on device, the keyword spotting system can select a threshold based on the target FRR, in which positive samples are incorrectly denied. With the threshold, conventional and personalized keyword spotting systems can be evaluated based on their performance in rejecting general negatives from news and conversations. For example, Table 2 depicts FAR at the specific operating points FRR 1% and FRR 10%, on Librispeech and WSJ datasets. In some examples, vanilla methods that only use a loss function for KWS cannot reject general negatives correctly because the general negatives contain target keywords or keywords having similar pronunciation to the target, which leads high scores for negatives. The systems and techniques described herein utilize both keyword and speaker information and can more accurately and efficiently reject general negatives. In some examples, the systems and techniques described herein can utilize PK-MTL to selectively implement one or more of the three tasks (e.g., C-KWS, TB-KWS, TO-KWS), for example according to the requirements, use case, user preferences, etc., of the target device.

Figure 6:
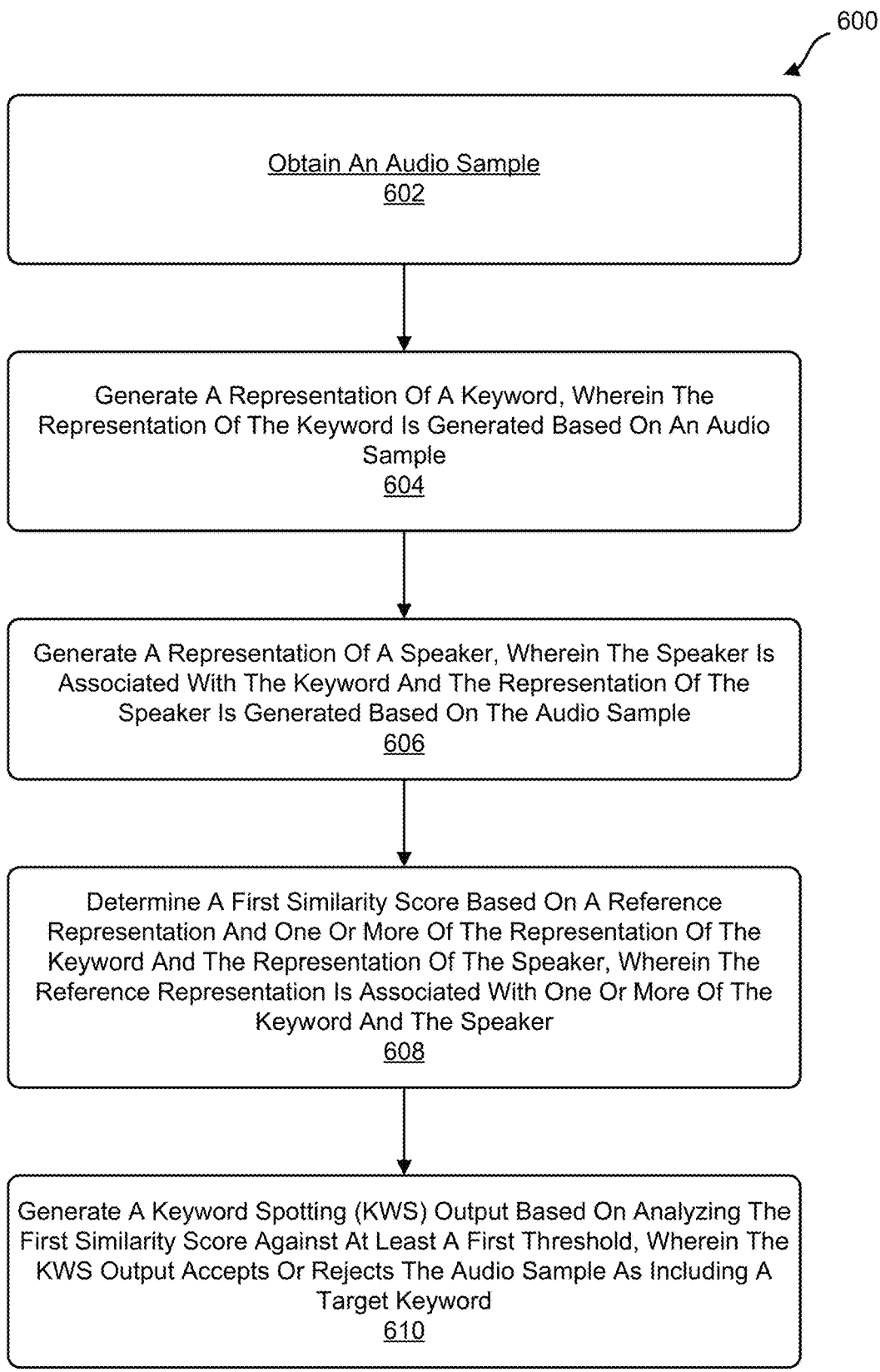
FIG. 6 is a flow diagram illustrating an example of a process for processing one or more audio samples, in accordance with some examples.

FIG. 6 is a flowchart illustrating an example of a process 600 for processing one or more audio samples. Although the example process 600 depicts a particular sequence of operations, the sequence may be altered without departing from the scope of the present disclosure. For example, some of the operations depicted may be performed in parallel or in a different sequence that does not materially affect the function of the process 600. In other examples, different components of an example device or system that implements the process 600 may perform functions at substantially the same time or in a specific sequence.

At block 602, the process 600 includes obtaining an audio sample. For example, the audio sample can be obtained using an electronic device, including an electronic device implementing the SOC 100 of FIG. 1 and/or an electronic device implementing the computing device architecture 700 of FIG. 7. In some cases, the electronic device can include one or more of a smartphone, a table computer, a wearable electronic device, a smart TV, a smart speaker, etc. For example, the audio sample can be obtained using an electronic device including a speech recognition function for receiving voice commands from a user. For instance, the audio sample can be obtained using one or more of the electronic devices (e.g., voice assistant devices) 308 with a keyword spotting system, as depicted in FIG. 3. The one or more audio samples can include one or more of the example audio samples 302, 304, 306 of FIG. 3. In some cases, the audio sample can be obtained using one or more microphones and/or other audio sensors. The one or more microphones and/or audio sensors can be included in an electronic device, including an electronic device implementing the SOC 100 of FIG. 1 and/or an electronic device implementing the computing device architecture 700 of FIG. 7.

In some examples, the audio sample can be obtained using one or more sensors associated with the sensor processor 114 of FIG. 1. For instance, the sensor processor 114 can be associated with or connected to one or more sensors for providing sensor input(s) to the sensor processor 114. The one or more sensors associated with or connected to sensor processor 114 can include one or more microphones and/or other audio sensors for obtaining the audio sample. In some cases, the one or more sensors can include one or more microphones for receiving sound (e.g., an audio input), including sound or audio inputs that can be used to perform keyword spotting (KWS) as described herein. In some cases, the sound or audio input received by the one or more microphones (and/or other sensors) may be digitized into data packets for analysis and/or transmission. The audio input may include ambient sounds in the vicinity of a computing device associated with the SoC 100 of FIG. 1 and/or may include speech from a user of the computing device associated with the SoC 100 of FIG. 1. In some cases, a computing device associated with the SoC 100 of FIG. 1 can additionally, or alternatively, be communicatively coupled to one or more peripheral devices and/or can be configured to communicate with one or more remote computing devices or external resources, for example using a wireless transceiver and a communication network, such as a cellular communication network.

Figure 7:
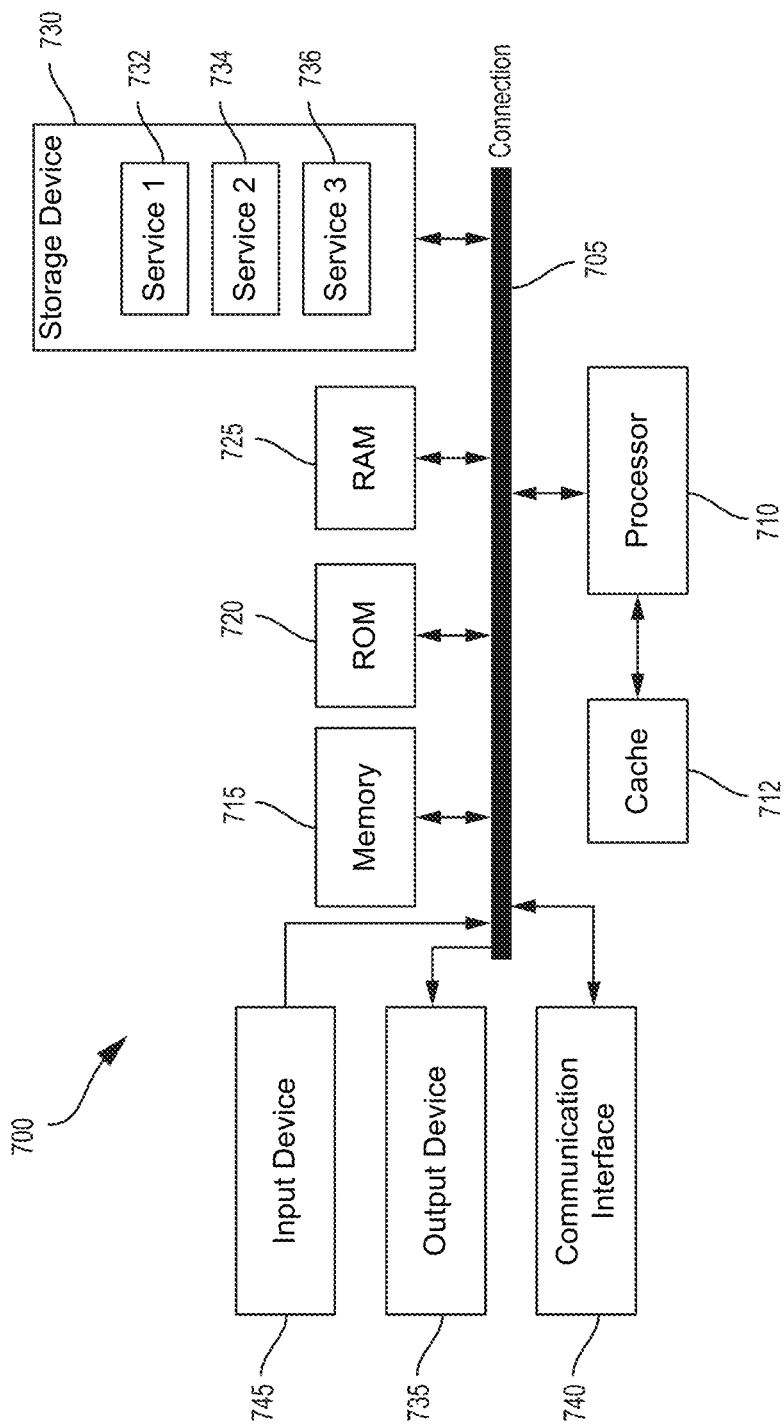
FIG. 7 is a block diagram illustrating an example of a computing system for implementing certain aspects described herein.

In another example, the audio sample can be obtained using the input device 745 of the computing device architecture 700 of FIG. 7. For instance, the input device 745 can be an input mechanism such as a microphone for speech. In some examples, the input device 745 of the computing device architecture 700 of FIG. 7 can be the same as or similar to the one or more sensors described above with respect to the sensor processor 114 of FIG. 1.

At block 704, the process 700 includes generating a representation of a keyword, wherein the representation of the keyword is generated based on the audio sample. For example, the representation of the keyword can be a keyword embedding generated based on the audio sample. In some cases, the representation of the keyword can be the same as or similar to the keyword embedding depicted in FIG. 5A. In some examples, the representation of the keyword can be the same as or similar to the keyword and speaker embedding 514 of FIG. 5B. In some examples, the representation of the keyword can be generated using a multi-task learning (MTL) machine learning network. For example, the representation of the keyword can be the same as or similar to the keyword embedding of FIG. 5A (e.g., as mentioned above), and can be generated based on an input spectrogram 502 of an audio sample, using a shared encoder 504 and a KWS Sub-Net 506, as also depicted in FIG. 5A. In some cases, the representation of the keyword can be generated based on an audio sample obtained using one of the voice assistant devices 308 with a keyword spotting system illustrated in FIG. 3. For instance, the representation of the keyword can be generated based on one or more of the audio samples 302, 304, 306 of FIG. 3.

At block 706, the process 700 includes generating a representation of a speaker, wherein the speaker is associated with the keyword and the presentation of the speaker is generated based on the audio sample. For example, the representation of the speaker can be a speaker embedding generated based on the audio sample. In some cases, the representation of the speaker can be the same as or similar to the speaker embedding depicted in FIG. 5A. In some examples, the representation of the speaker can be the same as or similar to the keyword and speaker embedding 514 of FIG. 5B. In some examples, the representation of the speaker can be generated using a multi-task learning (MTL) machine learning network. For example, the representation of the speaker can be the same as or similar to the speaker embedding of FIG. 5A (e.g., as mentioned above), and can be generated based on an input spectrogram 502 of an audio sample, using a shared encoder 504 and an SV Sub-Net 508, as also depicted in FIG. 5A. In some cases, the representation of the speaker can be generated based on an audio sample obtained using one of the voice assistant devices 308 with a keyword spotting system illustrated in FIG. 3. For instance, the representation of the speaker can be generated based on one or more of the audio samples 302, 304, 306 of FIG. 3. In some examples, the representation of the speaker can be associated with a speaker of the audio sample (e.g., the target user associated with the audio sample 302 of FIG. 3, etc.).

At block 708, the process 700 includes determining a first similarity score based on a reference representation and one or more of the representation of the keyword and the representation of the speaker, wherein the reference representation is associated with one or more of the keyword and the speaker. For example, the reference representation can be the same as or similar to the task-specific embedding 518 of FIG. 5B. In some cases, the reference representation can be generated using a task-specific machine learning module, such as the task-specific machine learning module 516 of FIG. 5B. In some cases, the first similarity score can be generated using a task-adaptation machine learning network.

Determining the first similarity score can comprise generating a keyword similarity score between the representation of the keyword and a reference representation of a target keyword. The target keyword can be a target keyword such as a pre-determined wakeup or activation command associated with a voice activated device implementing keyword spotting. Determining the first similarity score can further comprise generating a speaker similarity score between the representation of the speaker and a reference representation of the speaker. The first similarity score can be determined as a combined similarity score generated based at least in part on the keyword similarity score and the speaker similarity score. For instance, one or more (or both) of the keyword similarity score and the speaker similarity score can be a cosine similarity score. For instance, the cosine similarity score used as the keyword similarity score can be the same as or similar to a cosine similarity score associated with the cosine classifier 510 for the keyword embedding of FIG. 5A. In some cases, the cosine similarity score used as the speaker similarity score can be the same as or similar to a cosine similarity score associated with the cosine classifier 512 for the speaker embedding of FIG. 5A.

In some examples, the combined similarity score can be generated using a score combination function. For instance, the score combination function can be a linear combination function between the keyword similarity score and the speaker similarity score. The linear combination function can include at least a first tunable weighting parameter. In some cases, the score combination function can be associated with one or more neural networks and may be trained to tune the first tunable weighting parameters to minimize a keyword spotting (KWS) false rejection rate (FRR) associated with the one or more neural networks. In some examples, the first tunable weighting parameter can be set to a first value to perform target user-biased keyword spotting (TB-KWS). In another example, the first tunable weighting parameter can be set to a second value to perform target user-only keyword spotting (TO-KWS), wherein the first value is larger than the second value.

In some cases, determining the first similarity score between the reference representation and one or more of the representation of the keyword and the representation of the speaker comprises generating a task-specific embedding using the representation of the keyword and the representation of the speaker. For instance, the task-specific embedding can be the same as or similar to the task-specific embedding 518 of FIG. 5B. The first similarity score can be generated as a task-specific embedding using the keyword and speaker embedding 514 of FIG. 5B (e.g., the representation of the keyword and the representation of the speaker can be the same as or similar to the keyword and speaker embedding 514 of FIG. 5B).

In some cases, the task-specific embedding can be generated based on an output of a first neural network, wherein the output of the first neural network includes a target user-biased keyword spotting (TB-KWS) task-specific embedding. For instance, the task-specific embedding can be generated using the task-specific neural network module 516 of FIG. 5B and the output of the task-specific neural network module 516 (e.g., the task-specific embedding 518) can include a TB-KWS task-specific embedding.

In some examples, determining the first similarity score further comprises determining the first similarity score as a cosine similarity score between the task-specific embedding and the reference representation, wherein the reference representation is a learnable weight for keyword classification. In some cases, the task-specific embedding can be generated based on an output of a second neural network, wherein the output of the second neural network includes a target user-only keyword spotting (TO-KWS) task-specific embedding. For example, the task-specific module 516 of FIG. 5B can generate as output a task-specific embedding 518 comprising a TO-KWS task-specific embedding.

At block 710, the process 700 includes generating a keyword spotting (KWS) output based on analyzing the first similarity score against at least a first threshold, wherein the KWS output accepts or rejects the audio sample as including a target keyword. In some cases, the KWS output can be generated using a task-adaptation machine learning network. The task-adaptation machine learning network used to generate the KWS output can be the same as the task-adaptation machine learning network used to generate the first similarity score.

In some examples, the processes described herein (e.g., process 600, and/or any other process described herein) may be performed by a computing device, apparatus, or system. In one example, the process 600 can be performed by a computing device or system having the computing device architecture 700 of FIG. 7. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 illustrates an example computing device architecture 700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 700 are shown in electrical communication with each other using connection 705, such as a bus. The example computing device architecture 700 includes a processing unit (CPU or processor) 710 and computing device connection 705 that couples various computing device components including computing device memory 715, such as read only memory (ROM) 720 and random-access memory (RAM) 725, to processor 710.

Computing device architecture 700 can include a cache of high-speed memory connected directly with, in close proximity to, or integrated as part of processor 710. Computing device architecture 700 can copy data from memory 715 and/or the storage device 730 to cache 712 for quick access by processor 710. In this way, the cache can provide a performance boost that avoids processor 710 delays while waiting for data. These and other engines can control or be configured to control processor 710 to perform various actions. Other computing device memory 715 may be available for use as well. Memory 715 can include multiple different types of memory with different performance characteristics. Processor 710 can include any general-purpose processor and a hardware or software service, such as service 1 732, service 2 734, and service 3 736 stored in storage device 730, configured to control processor 710 as well as a special-purpose processor where software instructions are incorporated into the processor design. Processor 710 may be a self-contained system, containing multiple cores or processors, a bus, memory controller, cache, etc. A multi-core processor may be symmetric or asymmetric.

To enable user interaction with the computing device architecture 700, input device 745 can represent any number of input mechanisms, such as a microphone for speech, a touch-sensitive screen for gesture or graphical input, keyboard, mouse, motion input, speech and so forth. Output device 735 can also be one or more of a number of output mechanisms known to those of skill in the art, such as a display, projector, television, speaker device, etc. In some instances, multimodal computing devices can enable a user to provide multiple types of input to communicate with computing device architecture 700. Communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. Storage device 730 can include services 732, 734, 736 for controlling processor 710. Other hardware or software modules or engines are contemplated. Storage device 730 can be connected to the computing device connection 705. In one aspect, a hardware module that performs a particular function can include the software component stored in a computer-readable medium in connection with the necessary hardware components, such as processor 710, connection 705, output device 735, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for processing one or more audio samples, comprising: obtaining an audio sample; generating a representation of a keyword, wherein the representation of the keyword is generated based on the audio sample; generating a representation of a speaker, wherein the speaker is associated with the keyword and the representation of the speaker is generated based on the audio sample; determining a first similarity score based on a reference representation and one or more of the representation of the keyword and the representation of the speaker, wherein the reference representation is associated with one or more of the keyword and the speaker; and generating a keyword spotting (KWS) output based on analyzing the first similarity score against at least a first threshold, wherein the KWS output accepts or rejects the audio sample as including a target keyword.

Aspect 2. The method of Aspect 1, wherein: the representation of the keyword is a keyword embedding generated based on the audio sample; and the representation of the speaker is a speaker embedding generated based on the audio sample.

Aspect 3. The method of any of Aspects 1 to 2, wherein one or more of the representation of the keyword or the representation of the speaker is generated using a multi-task learning (MTL) machine learning network.

Aspect 4. The method of any of Aspects 1 to 3, wherein the first similarity score and the KWS output are generated using a task-adaptation machine learning network.

Aspect 5. The method of any of Aspects 1 to 4, wherein determining the first similarity score comprises: generating a keyword similarity score between the representation of the keyword and a reference representation of the target keyword; generating a speaker similarity score between the representation of the speaker and a reference representation of the speaker; and determining the first similarity score as a combined similarity score generated based at least in part on the keyword similarity score and the speaker similarity score.

Aspect 6. The method of Aspect 5, wherein one or more of the keyword similarity score or the speaker similarity score is a cosine similarity score.

Aspect 7. The method of any of Aspects 5 to 6, wherein the combined similarity score is generated using a score combination function.

Aspect 8. The method of Aspect 7, wherein: the score combination function is a linear combination function between the keyword similarity score and the speaker similarity score; and the linear combination function includes at least a first tunable weighting parameter.

Aspect 9. The method of Aspect 8, wherein the score combination function is associated with one or more neural networks and is trained to tune the first tunable weighting parameter to minimize a keyword spotting (KWS) false rejection rate (FRR) associated with the one or more neural networks.

Aspect 10. The method of any of Aspects 8 to 9, further comprising: setting the first tunable weighting parameter to a first value to perform target user-biased keyword spotting (TB-KWS); and setting the first tunable weighting parameter to a second value to perform target user-only keyword spotting (TO-KWS), wherein the first value is larger than the second value.

Aspect 11. The method of any of Aspects 1 to 10, wherein determining the first similarity score comprises: generating a task-specific embedding using the representation of the keyword and the representation of the speaker; and determining the first similarity score as a cosine similarity score between the task-specific embedding and the reference representation, wherein the reference representation is a learnable weight for keyword classification.

Aspect 12. The method of Aspect 11, further comprising generating the task-specific embedding based on an output of a first neural network, the output of the first neural network including a target user-biased keyword spotting (TB-KWS) task-specific embedding.

Aspect 13. The method of Aspect 12, further comprising generating the task-specific embedding based on an output of a second neural network, the output of the second neural network including a target user-only keyword spotting (TO-KWS) task-specific embedding.

Aspect 14. An apparatus for processing one or more audio samples, comprising: at least one memory; and at least one processor coupled to the at least one memory, the at least one processor configured to: obtain an audio sample; generate a representation of a keyword, wherein the representation of the keyword is generated based on the audio sample; generate a representation of a speaker, wherein the speaker is associated with the keyword and the representation of the speaker is generated based on the audio sample; determine a first similarity score based on a reference representation and one or more of the representation of the keyword and the representation of the speaker, wherein the reference representation is associated with one or more of the keyword and the speaker; and generate a keyword spotting (KWS) output based on analyzing the first similarity score against at least a first threshold, wherein the KWS output accepts or rejects the audio sample as including a target keyword.

Aspect 15. The apparatus of Aspect 14, wherein: the representation of the keyword is a keyword embedding generated based on the audio sample; and the representation of the speaker is a speaker embedding generated based on the audio sample.

Aspect 16. The apparatus of any of Aspects 14 to 15, wherein one or more of the representation of the keyword or the representation of the speaker is generated using a multi-task learning (MTL) machine learning network.

Aspect 17. The apparatus of any of Aspects 14 to 16, wherein the first similarity score and the KWS output are generated using a task-adaptation machine learning network.

Aspect 18. The apparatus of any of Aspects 14 to 17, wherein, to determine the first similarity score, the at least one processor is configured to: generate a keyword similarity score between the representation of the keyword and a reference representation of the target keyword; generate a speaker similarity score between the representation of the speaker and a reference representation of the speaker; and determine the first similarity score as a combined similarity score generated based at least in part on the keyword similarity score and the speaker similarity score.

Aspect 19. The apparatus of Aspect 18, wherein one or more of the keyword similarity score or the speaker similarity score is a cosine similarity score.

Aspect 20. The apparatus of any of Aspects 18 to 19, wherein the combined similarity score is generated using a score combination function.

Aspect 21. The apparatus of Aspect 20, wherein: the score combination function is a linear combination function between the keyword similarity score and the speaker similarity score; and the linear combination function includes at least a first tunable weighting parameter.

Aspect 22. The apparatus of Aspect 21, wherein the score combination function is associated with one or more neural networks and is trained to tune the first tunable weighting parameter to minimize a keyword spotting (KWS) false rejection rate (FRR) associated with the one or more neural networks.

Aspect 23. The apparatus of any of Aspects 21 to 22, wherein the at least one processor is further configured to: set the first tunable weighting parameter to a first value to perform target user-biased keyword spotting (TB-KWS); and set the first tunable weighting parameter to a second value to perform target user-only keyword spotting (TO-KWS), wherein the first value is larger than the second value.

Aspect 24. The apparatus of any of Aspects 14 to 23, wherein, to determine the first similarity score, the at least one processor is configured to: generate a task-specific embedding using the representation of the keyword and the representation of the speaker; and determine the first similarity score as a cosine similarity score between the task-specific embedding and the reference representation, wherein the reference representation is a learnable weight for keyword classification.

Aspect 25. The apparatus of Aspect 24, wherein the at least one processor is further configured to: generate the task-specific embedding based on an output of a first neural network, the output of the first neural network including a target user-biased keyword spotting (TB-KWS) task-specific embedding.

Aspect 26. The apparatus of Aspect 25, wherein the at least one processor is further configured to: generate the task-specific embedding based on an output of a second neural network, the output of the second neural network including a target user-only keyword spotting (TO-KWS) task-specific embedding.

Aspect 27. A computer-readable storage medium storing instructions that, when executed by one or more processors, cause at least one processor to: obtain an audio sample; generate a representation of a keyword, wherein the representation of the keyword is generated based on the audio sample; generate a representation of a speaker, wherein the speaker is associated with the keyword and the representation of the speaker is generated based on the audio sample; determine a first similarity score based on a reference representation and one or more of the representation of the keyword and the representation of the speaker, wherein the reference representation is associated with one or more of the keyword and the speaker; and generate a keyword spotting (KWS) output based on analyzing the first similarity score against at least a first threshold, wherein the KWS output accepts or rejects the audio sample as including a target keyword.

Aspect 28. The computer-readable storage medium of Aspect 27, wherein: the representation of the keyword is a keyword embedding generated based on the audio sample; and the representation of the speaker is a speaker embedding generated based on the audio sample.

Aspect 29. The computer-readable storage medium of any of Aspects 27 to 28, wherein one or more of the representation of the keyword or the representation of the speaker is generated using a multi-task learning (MTL) machine learning network.

Aspect 30. The computer-readable storage medium of any of Aspects 27 to 29, wherein the first similarity score and the KWS output are generated using a task-adaptation machine learning network.

Aspect 31. The computer-readable storage medium of any of Aspects 27 to 30, wherein, to determine the first similarity score, the instructions further cause the at least one processor to: generate a keyword similarity score between the representation of the keyword and a reference representation of the target keyword; generate a speaker similarity score between the representation of the speaker and a reference representation of the speaker; and determine the first similarity score as a combined similarity score generated based at least in part on the keyword similarity score and the speaker similarity score.

Aspect 32. The computer-readable storage medium of Aspect 31, wherein one or more of the keyword similarity score or the speaker similarity score is a cosine similarity score.

Aspect 33. The computer-readable storage medium of any of Aspects 31 to 32, wherein the combined similarity score is generated using a score combination function.

Aspect 34. The computer-readable storage medium of Aspect 33, wherein: the score combination function is a linear combination function between the keyword similarity score and the speaker similarity score; and the linear combination function includes at least a first tunable weighting parameter.

Aspect 35. The computer-readable storage medium of Aspect 34, wherein the score combination function is associated with one or more neural networks and is trained to tune the first tunable weighting parameter to minimize a keyword spotting (KWS) false rejection rate (FRR) associated with the one or more neural networks.

Aspect 36. The computer-readable storage medium of any of Aspects 34 to 35, wherein the instructions further cause the at least one processor to: set the first tunable weighting parameter to a first value to perform target user-biased keyword spotting (TB-KWS); and set the first tunable weighting parameter to a second value to perform target user-only keyword spotting (TO-KWS), wherein the first value is larger than the second value.

Aspect 37. The computer-readable storage medium of any of Aspects 27 to 36, wherein, to determine the first similarity score, the instructions cause the at least one processor to: generate a task-specific embedding using the representation of the keyword and the representation of the speaker; and determine the first similarity score as a cosine similarity score between the task-specific embedding and the reference representation, wherein the reference representation is a learnable weight for keyword classification.

Aspect 38. The computer-readable storage medium of Aspect 37, wherein the instructions further cause the at least one processor to: generate the task-specific embedding based on an output of a first neural network, the output of the first neural network including a target user-biased keyword spotting (TB-KWS) task-specific embedding.

Aspect 39. The computer-readable storage medium of Aspect 38, wherein the instructions further cause the at least one processor to: generate the task-specific embedding based on an output of a second neural network, the output of the second neural network including a target user-only keyword spotting (TO-KWS) task-specific embedding.

Aspect 40. A non-transitory computer-readable medium including instructions that, when executed by at least one processor, cause the at least one processor to perform operations according to any of Aspects 1 to 13.

Aspect 41. A non-transitory computer-readable medium including instructions that, when executed by at least one processor, cause the at least one processor to perform operations according to any of Aspects 14 to 26.

Aspect 42. A non-transitory computer-readable medium including instructions that, when executed by at least one processor, cause the at least one processor to perform operations according to any of Aspects 27 to 39.

Aspect 43. An apparatus for processing one or more audio samples, the apparatus comprising one or more means for performing operations according to any of Aspects 1 to 13.

Aspect 44. An apparatus for processing one or more audio samples, the apparatus comprising one or more means for performing operations according to any of Aspects 14 to 26.

Aspect 45. An apparatus for processing one or more audio samples, the apparatus comprising one or more means for performing operations according to any of Aspects 27 to 39.

What is claimed is:

1. A method for processing one or more audio samples, comprising:
   obtaining an audio sample;
   generating a representation of a keyword, wherein the representation of the keyword is generated based on the audio sample;
   generating a representation of a speaker, wherein the speaker is associated with the keyword and the representation of the speaker is generated based on the audio sample;
   determining a first similarity score based on a reference representation and one or more of the representation of the keyword and the representation of the speaker, wherein the reference representation is associated with one or more of the keyword and the speaker; and
   generating a keyword spotting (KWS) output based on analyzing the first similarity score against at least a first threshold, wherein the KWS output accepts or rejects the audio sample as including a target keyword;
   wherein determining the first similarity score comprises:
      generating a keyword similarity score between the representation of the keyword and a reference representation of the target keyword;
      generating a speaker similarity score between the representation of the speaker and a reference representation of the speaker; and
      determining the first similarity score as a combined similarity score generated based at least in part on the keyword similarity score and the speaker similarity score.

2. The method of claim 1, wherein:
   the representation of the keyword is a keyword embedding generated based on the audio sample; and
   the representation of the speaker is a speaker embedding generated based on the audio sample.

3. The method of claim 1, wherein one or more of the representation of the keyword or the representation of the speaker is generated using a multi-task learning (MTL) machine learning network.

4. The method of claim 1, wherein the first similarity score and the KWS output are generated using a task-adaptation machine learning network.

5. The method of claim 1, wherein one or more of the keyword similarity score or the speaker similarity score is a cosine similarity score.

6. The method of claim 1, wherein the combined similarity score is generated using a score combination function.

7. The method of claim 6, wherein:
the score combination function is a linear combination function between the keyword similarity score and the speaker similarity score; and
the linear combination function includes at least a first tunable weighting parameter.

8. The method of claim 7, wherein the score combination function is associated with one or more neural networks and is trained to tune the first tunable weighting parameter to minimize a keyword spotting (KWS) false rejection rate (FRR) associated with the one or more neural networks.

9. The method of claim 7, further comprising:
setting the first tunable weighting parameter to a first value to perform target user-biased keyword spotting (TB-KWS); and
setting the first tunable weighting parameter to a second value to perform target user-only keyword spotting (TO-KWS), wherein the first value is larger than the second value.

10. The method of claim 1, wherein determining the first similarity score comprises:
generating a task-specific embedding using the representation of the keyword and the representation of the speaker; and
determining the first similarity score as a cosine similarity score between the task-specific embedding and the reference representation, wherein the reference representation is a learnable weight for keyword classification.

11. The method of claim 10, further comprising generating the task-specific embedding based on an output of a first neural network, the output of the first neural network including a target user-biased keyword spotting (TB-KWS) task-specific embedding.

12. The method of claim 11, further comprising generating the task-specific embedding based on an output of a second neural network, the output of the second neural network including a target user-only keyword spotting (TO-KWS) task-specific embedding.

13. An apparatus for processing one or more audio samples, comprising:
at least one memory; and
at least one processor coupled to the at least one memory, the at least one processor configured to:
obtain an audio sample;
generate a representation of a keyword, wherein the representation of the keyword is generated based on the audio sample;
generate a representation of a speaker, wherein the speaker is associated with the keyword and the representation of the speaker is generated based on the audio sample;
determine a first similarity score based on a reference representation and one or more of the representation of the keyword and the representation of the speaker, wherein the reference representation is associated with one or more of the keyword and the speaker; and
generate a keyword spotting (KWS) output based on analyzing the first similarity score against at least a first threshold, wherein the KWS output accepts or rejects the audio sample as including a target keyword;
wherein, to determine the first similarity score, the at least one processor is configured to:
generate a keyword similarity score between the representation of the keyword and a reference representation of the target keyword;
generate a speaker similarity score between the representation of the speaker and a reference representation of the speaker; and
determine the first similarity score as a combined similarity score generated based at least in part on the keyword similarity score and the speaker similarity score.

14. The apparatus of claim 13, wherein:
the representation of the keyword is a keyword embedding generated based on the audio sample; and
the representation of the speaker is a speaker embedding generated based on the audio sample.

15. The apparatus of claim 13, wherein one or more of the representation of the keyword or the representation of the speaker is generated using a multi-task learning (MTL) machine learning network.

16. The apparatus of claim 13, wherein the first similarity score and the KWS output are generated using a task-adaptation machine learning network.

17. The apparatus of claim 13, wherein one or more of the keyword similarity score or the speaker similarity score is a cosine similarity score.

18. The apparatus of claim 13, wherein the combined similarity score is generated using a score combination function.

19. The apparatus of claim 18, wherein:
the score combination function is a linear combination function between the keyword similarity score and the speaker similarity score; and
the linear combination function includes at least a first tunable weighting parameter.

20. The apparatus of claim 19, wherein the score combination function is associated with one or more neural networks and is trained to tune the first tunable weighting parameter to minimize a keyword spotting (KWS) false rejection rate (FRR) associated with the one or more neural networks.

21. The apparatus of claim 19, wherein the at least one processor is further configured to:
set the first tunable weighting parameter to a first value to perform target user-biased keyword spotting (TB-KWS); and
set the first tunable weighting parameter to a second value to perform target user-only keyword spotting (TO-KWS), wherein the first value is larger than the second value.

22. The apparatus of claim 13, wherein, to determine the first similarity score, the at least one processor is configured to:
generate a task-specific embedding using the representation of the keyword and the representation of the speaker; and
determine the first similarity score as a cosine similarity score between the task-specific embedding and the reference representation, wherein the reference representation is a learnable weight for keyword classification.

23. The apparatus of claim 22, wherein the at least one processor is further configured to:
generate the task-specific embedding based on an output of a first neural network, the output of the first neural network including a target user-biased keyword spotting (TB-KWS) task-specific embedding.

24. The apparatus of claim 23, wherein the at least one processor is further configured to:
generate the task-specific embedding based on an output of a second neural network, the output of the second neural network including a target user-only keyword spotting (TO-KWS) task-specific embedding.

* * * * *